Nov. 18, 1958     C. B. MOORE ET AL     2,860,557
ORTHOGRAPHIC CAMERA
Filed March 29, 1957
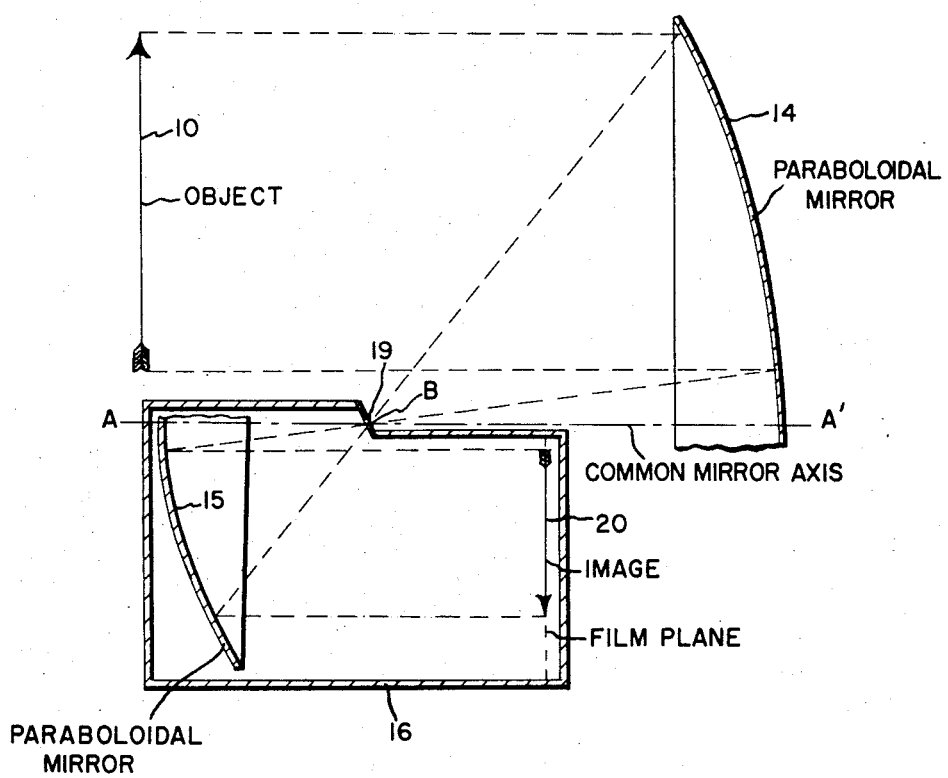
INVENTORS
CHARLES B. MOORE
ROBERT D. VAN VELD
BY Harry J. McCauley
ATTORNEY

United States Patent Office 2,860,557
Patented Nov. 18, 1958

2,860,557
ORTHOGRAPHIC CAMERA

Charles B. Moore, Kennett Square, Pa., and Robert D. Van Veld, Wilmington, Del., assignors to E. I. du Pont de Nemours and Company, Wilmington, Del., a corporation of Delaware Application March 29, 1957, Serial No. 649,354

3 Claims. (Cl. 95—11)

This invention relates to a photographic camera, and particularly to a camera which is adapted to form orthographic representations of objects.

Ordinary photographic cameras view objects from a point and, therefore, are perspective in nature, which is not objectionable in most instances and, indeed, is in keeping with the human faculty of sight and the visual perceptions which occur to human beings. In some instances, however, perspective representations are highly objectionable and, in fact, cannot be tolerated because of the illusory effects which are inherent therein. This is true as regards a relatively new field which is growing in prominence, namely, the photography of industrial models to obtain a photographic representation which approaches mechanical drawings in dimensional accuracy.

The utilization of models for the representation of industrial establishments, such as chemical manufacturing plants, oil refineries and the like, has many advantages, since the designer is able to actually see the relative disposition of various pieces of the equipment, as well as the connecting lines for the flow of materials and service facilities, thereby freeing him from the difficult task of visualizing a complex situation in three dimensions from a multiplicity of arrangement drawings. Another advantage of industrial models is that there is flexibility in the making of changes with respect to plant layout at an early stage in the development of the design, which saves expenditures in materials, draftsmen's time and in other ways. The models can also be utilized to train operating personnel and considerations of safety can be better served. The construction of plants, however, requires guidance drawings for use on the site and it has hitherto not been possible to meet this requirement without extensive drafting, quite apart from the industrial model itself. This drafting effort could be to a large degree saved if dimensionally true photographs could be taken of selected portions or even of the entire industrial model but, unfortunately, the perspective effects hereinbefore referred to introduce errors in representation which has hitherto rendered such a course impossible.

A primary object of this invention is to provide an orthographic camera which secures its image via essentially parallel light rays, thereby completely eliminating the errors inherent in perspective viewing. Other objects of this invention include the provision of a simple orthographic camera and one which requires no adjustments or special training on the part of the user. The manner in which these and other objects of this invention are obtained will become apparent from the detailed description and the drawing, which is a schematic representation of a preferred embodiment of a camera constructed according to this invention.

Generally, the orthographic camera according to this invention comprises a pair of paraboloidal reflecting mirrors which are disposed coaxially and confocally in non-masking relationship one to another, the mirrors being faced one towards the other with one confronting the object to be photographed and the other enclosed in a light-tight box, except for an aperture admitting light reflected from the first mirror, the mirror in the box being directed towards the photosensitive medium upon which the image is to be impressed.

Referring to the drawing, the object to be photographed is represented schematically at 10, it being understood that the object may be an industrial model, or a part of an industrial model, of more or less complicated nature. The drawing is a side elevation sectional view in which the object is shown vertically oriented with the arrow head pointing upward. The camera of this invention incorporates paraboloidal mirror 14 having its reflective surface directed towards object 10, and paraboloidal mirror 15 mounted within light-tight housing 16, the two mirrors being fixed in location relative to one another by a suitable rigid framework not shown.

As detailed in the drawing, mirrors 14 and 15 are represented as being essentially half-sections formed by cutting full mirrors across the horizontal diameters. Mirrors 14 and 15 have surfaces of paraboloidal configuration and it is necessary that the axes of both mirrors fall on a common line, designated A—A', and that both mirrors have their foci at a common point B, which necessarily lies along line A—A'. Under the circumstances, each of the mirrors 14 and 15 would present the appearance of a semicircle to an observer viewing them from the front. Since it is unusual for object 10 to have a semicircular profile, it will be understood that objects which are rectangular or square in outline will utilize only their projected area on mirror 14 and, therefore, mirror 14 has a general effective area which is dictated by the outline of the object. Accordingly, mirror 14 may be any suitable portion of a complete paraboloid, and this is equally true of mirror 15, so that the term "paraboloidal mirror," as utilized in this description and in the claims, is intended to comprehend any finite portion of such a mirror without regard to its area extent or shape of perimeter. Mirrors 14 and 15, being of paraboloidal configuration, respectively focus at B and receive therefrom only light parallel to their axes, i. e., paraxial light. It is therefore possible, with the means hereinafter described in greater detail, to avoid all except very minimal distortion of no significance from the practical standpoint which can arise from any incidental non-paraxial light influx.

It has proved convenient to utilize mirrors 14 and 15 of half section extent and such mirrors are preferably fabricated from half molds, which safeguards against any optical distortion which occurs as a result of cutting a full mirror in half along a diameter.

As indicated in broken line representation in the drawing, the light reflected from object 10 along lines parallel to the mirror axis impinges on mirror 14 and, due to the inherent property of a paraboloidal mirror which focuses radiation parallel to the axis of the mirror at a focal point, converges on focal point B. It is desirable to limit the light passed to the photo-sensitive medium as strictly as possible to the light which is truly parallel to the mirror axes and, therefore, a relatively small diameter aperture 19 is provided at the focal point to pass only light substantially in focus at B while barring any other light, whether it be near-parallel light received from the object or extraneous light from the outside which is non-paraxial with respect to mirrors 14 and 15. The selective passage of light through aperture 19 insures the development of a sharp orthographic image on the photosensitive medium, this image being represented by the inverted arrow coincident with film plane 20.

Since the optical law applicable to paraboloidal mirrors functions equally well in reverse, and mirror 15 is likewise in focus at point B; diverging light received by mirror 15 from point B is reflected along lines substantially parallel to line A—A' and is brought to bear on the photosensitive material indicated schematically at 20. None of the details for the support of the photosensitive material or the transfer thereof are shown, nor is the shutter mechanism detailed because these features are not related to this invention, it being understood that such auxiliaries are commercially available in a wide variety of designs.

It is advantageous to photograph objects at close range with respect to mirror 14, since better definition is thereby attained. This is also true as regards film plane 20, which is preferably disposed as close to mirror 15 as practicable except that, of course, the film should not lie across the path of the divergent rays from point B so as to interfere with the passage of light to the second paraboloidal mirror. In accordance with well-known optical principles the ratio of image size to object size obtained will be that of the focal length of mirror 15 to the focal length of mirror 14.

In a typical installation, an anti-aircraft paraboloidal search light mirror of 60" diameter was utilized as mirror 14, only a region in the upper half being employed to receive the image from object 10. This mirror had a focal length of 25.5" and was mounted with its axis horizontal and coincident with the axis of a half-section paraboloidal mirror 15 of a diameter of 11" and a focal length of 4". An aperture 19 having a diameter of 0.016" was mounted in the light-tight box housing the photo-sensitive medium, the aperture 19 being fixed at the focal point B by optical clamps (not shown) locating mirror 14 fixedly with reference to mirror 15 and box 16. The system was tested for distortion by taking pictures of a multiplicity of annular objects, some of which were disposed vertically in single file parallel with the axis of the mirrors, with files spaced apart at varying distances normal to the common mirror axis and others of which were disposed horizontally with their bores parallel to the mirror axis. The objects were illuminated with three conventional Number 2 photographic flood lights and the photo-sensitive material employed was Du Pont "X–F" orthofilm, with which exposures of thirty seconds duration produced adequate negative densities. The representation obtained was confined solely to the surfaces confronting the viewing mirror 14, there being no representation at all of the interior surface of the hollow bores of the objects, and there was faithful reproduction of all vertical and horizontal lines, even for objects two or more feet removed from the axes of the mirrors. Thus, there was a complete elimination of perspective distortion such as is inevitably present in ordinary photographic reproduction, and of pin-cushion effect such as that observed where a single paraboloidal mirror is used.

From the foregoing, it will be understood that this invention is a truly orthographic camera which may be modified in various ways without departure from the essential spirit of the invention, and it is intended to be limited only by the scope of the following claims.

What is claimed is:

1. An orthographic camera comprising in combination a first paraboloidal reflecting mirror adapted to view an object to be photographed and a second paraboloidal reflecting mirror disposed on a common axis with said first mirror with reflective surface facing the reflective surface of said first mirror and at a common focal point with said first mirror, a light-tight housing enclosing said second mirror, an aperture in said light-tight housing disposed at said focal point transmitting substantially only the light passed through said focal point from said first mirror to said second mirror, and means for exposing a photosensitive medium disposed within said housing to light rays reflected from said second mirror.

2. An orthographic camera according to claim 1 wherein said aperture consists of a circular hole having a diameter within the range of from about 0.016" to about 0.096".

3. An orthographic camera comprising in combination a first paraboloidal reflecting mirror of focal length of about 25.5" adapted to view an object to be photographed and a second paraboloidal reflecting mirror of focal length of about 4" disposed on a common axis with said first mirror with reflective surface facing the reflective surface of said first mirror and at a common focal point with said first mirror, a light-tight housing enclosing said second mirror, a circular aperture of diameter of about 0.016" in said light-tight housing disposed at said focal point transmitting substantially only the light passed through said focal point from said first mirror to said second mirror, and means for exposing for predetermined time durations a photosensitive medium disposed within said housing to light rays reflected from said second mirror.

No references cited.